US010712127B2

(12) United States Patent
Tedder et al.

(10) Patent No.: US 10,712,127 B2
(45) Date of Patent: Jul. 14, 2020

(54) SPLINE ATTACHMENT

(71) Applicant: Tedder Industries, LLC, Post Falls, ID (US)

(72) Inventors: Thomas Tedder, Post Falls, ID (US); Taylor Vold, Valleyford, WA (US); Drew Stephens, Coeur d'Alene, ID (US)

(*) Notice: Subject to any disclaimer, the term of this patent is extended or adjusted under 35 U.S.C. 154(b) by 22 days.

(21) Appl. No.: 15/868,760

(22) Filed: Jan. 11, 2018

(65) Prior Publication Data
US 2018/0195834 A1 Jul. 12, 2018

Related U.S. Application Data

(60) Provisional application No. 62/445,029, filed on Jan. 11, 2017.

(51) Int. Cl.
*F41C 33/04* (2006.01)
*A45F 5/02* (2006.01)
*B60R 7/14* (2006.01)
*B60R 11/06* (2006.01)
*F16M 13/02* (2006.01)
*B60R 11/00* (2006.01)

(52) U.S. Cl.
CPC .............. *F41C 33/045* (2013.01); *A45F 5/02* (2013.01); *A45F 5/021* (2013.01); *B60R 7/14* (2013.01); *B60R 11/06* (2013.01); *F16M 13/022* (2013.01); *A45F 2005/025* (2013.01); *A45F 2200/0575* (2013.01); *A45F 2200/0591* (2013.01); *B60R 2011/0078* (2013.01); *B60R 2011/0085* (2013.01)

(58) Field of Classification Search
CPC .......... F41C 33/045; A45F 5/02; A45F 5/021; A45F 2005/025; A45F 2200/0575; A45F 2200/0591; A45F 2005/026; B60R 7/14; B60R 11/06; B60R 2011/0078; B60R 2011/0085; F16M 13/022; F16M 11/041; F16M 11/105; Y10T 403/7026; Y10T 403/7033; Y10T 403/7031; Y10T 403/7032; Y10T 403/598; F16D 2001/103
USPC ................................................... 248/288.11
See application file for complete search history.

(56) References Cited

U.S. PATENT DOCUMENTS

| | | | | | |
|---|---|---|---|---|---|
| 99,508 | A | * | 2/1870 | Williams | F16G 15/08 |
| | | | | | 24/583.11 |
| 2,448,278 | A | * | 8/1948 | Ronning | F16D 1/116 |
| | | | | | 192/71 |
| 3,240,519 | A | * | 3/1966 | Weasler | A01B 71/06 |
| | | | | | 285/276 |
| 3,480,310 | A | * | 11/1969 | McElwain | F16D 1/116 |
| | | | | | 403/322.2 |
| 4,185,935 | A | * | 1/1980 | Bierlein | F16B 21/16 |
| | | | | | 403/14 |

(Continued)

*Primary Examiner* — Ingrid M Weinhold
(74) *Attorney, Agent, or Firm* — Timberline Patent Law Group

(57) ABSTRACT

Representative implementations of devices and techniques provide a spline attachment assembly to mount and to support an implement (such as a handgun, for example) or an implement holster (such as a handgun holster, for example), or the like, in a variety of configurations. The spline attachment assembly includes a base having a receiver and a post having a shaft, the shaft arranged to be inserted into the receiver to removably couple the post to the base.

16 Claims, 6 Drawing Sheets

(56) References Cited

U.S. PATENT DOCUMENTS

| | | | | |
|---|---|---|---|---|
| 4,283,158 A * | 8/1981 | Takahata | F16D 1/116 | 403/322.2 |
| 4,392,759 A * | 7/1983 | Cook | F16D 1/116 | 403/11 |
| 4,645,368 A * | 2/1987 | Simpson | F16D 1/116 | 403/324 |
| 4,645,372 A * | 2/1987 | Suzuki | F16B 21/165 | 403/316 |
| 4,859,110 A * | 8/1989 | Dommel | F16B 21/088 | 403/325 |
| 5,167,355 A * | 12/1992 | Hill | A45F 5/00 | 224/193 |
| 5,318,375 A * | 6/1994 | Entrup | F16D 1/0894 | 403/322.1 |
| 5,564,610 A * | 10/1996 | Barron | A45F 5/00 | 224/197 |
| 5,628,578 A * | 5/1997 | McClanahan | B62D 1/16 | 403/13 |
| 5,632,568 A * | 5/1997 | Fechter | F16D 1/116 | 403/325 |
| 5,647,686 A * | 7/1997 | Hancock | B62D 1/16 | 403/328 |
| 5,730,342 A * | 3/1998 | Tien | A45F 5/02 | 224/197 |
| 5,779,385 A * | 7/1998 | Fechter | F16D 1/116 | 403/325 |
| 6,161,741 A * | 12/2000 | French | F41C 33/0227 | 224/192 |
| 6,283,348 B1 * | 9/2001 | Wang | A45F 5/02 | 224/197 |
| 6,484,913 B1 * | 11/2002 | Hancock | B60R 7/14 | 211/64 |
| 6,705,498 B2 * | 3/2004 | Gantert | B60R 7/14 | 224/282 |
| 6,736,136 B2 * | 5/2004 | Chen-Lieh | B63C 11/12 | 128/201.11 |
| 6,824,028 B2 * | 11/2004 | Mutai | A45F 5/02 | 224/269 |
| 6,889,878 B2 * | 5/2005 | Parsons | A45F 5/02 | 224/197 |
| 7,162,281 B2 * | 1/2007 | Kim | A45F 5/02 | 224/196 |
| 7,397,915 B2 * | 7/2008 | Tages | A45F 5/02 | 379/446 |
| 7,464,908 B2 * | 12/2008 | Files | F41B 5/066 | 124/86 |
| 8,087,451 B2 * | 1/2012 | Gammons | F16L 37/0841 | 165/46 |
| 8,328,055 B1 * | 12/2012 | Snyder | A45F 5/02 | 224/197 |
| 9,366,383 B2 * | 6/2016 | Chien | F16M 13/04 | |
| 9,797,679 B2 * | 10/2017 | Ponder | F41C 33/001 | |
| 2003/0161681 A1 * | 8/2003 | Schott | F16D 3/02 | 403/359.1 |
| 2007/0023468 A1 * | 2/2007 | Ford | F41C 33/045 | 224/197 |
| 2012/0266352 A1 * | 10/2012 | Busch | F16B 21/09 | 2/102 |
| 2015/0233669 A1 * | 8/2015 | Ponder | F41C 33/001 | 224/271 |
| 2015/0377585 A1 * | 12/2015 | Fowler | F41C 33/0236 | 224/271 |

* cited by examiner

SPLINE ATTACHMENT

PRIORITY CLAIM AND CROSS-REFERENCE TO RELATED APPLICATION

This application claims the benefit under 35 U.S.C. § 119(e)(1) of U.S. Provisional Application No. 62/445,029, filed Jan. 11, 2017, which is hereby incorporated by reference in its entirety.

BACKGROUND

Implements, such as tools, weapons, and the like, may be temporarily encased in a carrier (such as a holster, for instance) for protection of the implement and/or the user, while providing access to the implement. For example, a carrier may allow a user to conveniently carry the implement, safely retaining the implement until needed. When the implement is to be used, the user may withdraw the implement from the carrier, and then return it to the carrier when finished. In some cases, such as with a handgun for example, the holster may allow the user to conceal the implement, or to conceal the fact that the user is carrying the implement.

However, it may not be desirable for the user to wear the implement and holster at all times. For example, it may be desirable to move the implement and holster from a worn position on the user to a temporary location not on the user's person for a time (such as when driving an automobile, sitting at a desk, sleeping in a bed, etc.), and still have ready and convenient access to the implement.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure. Shapes and/or dimensions shown in the illustrations of the figures are for example, and other shapes and or dimensions may be used and remain within the scope of the disclosure, unless specified otherwise.

FIG. 9A shows the receiver in a locked configuration and FIG. 9B shows the receiver in an unlocked configuration.

DETAILED DESCRIPTION

Overview

Figure 1:
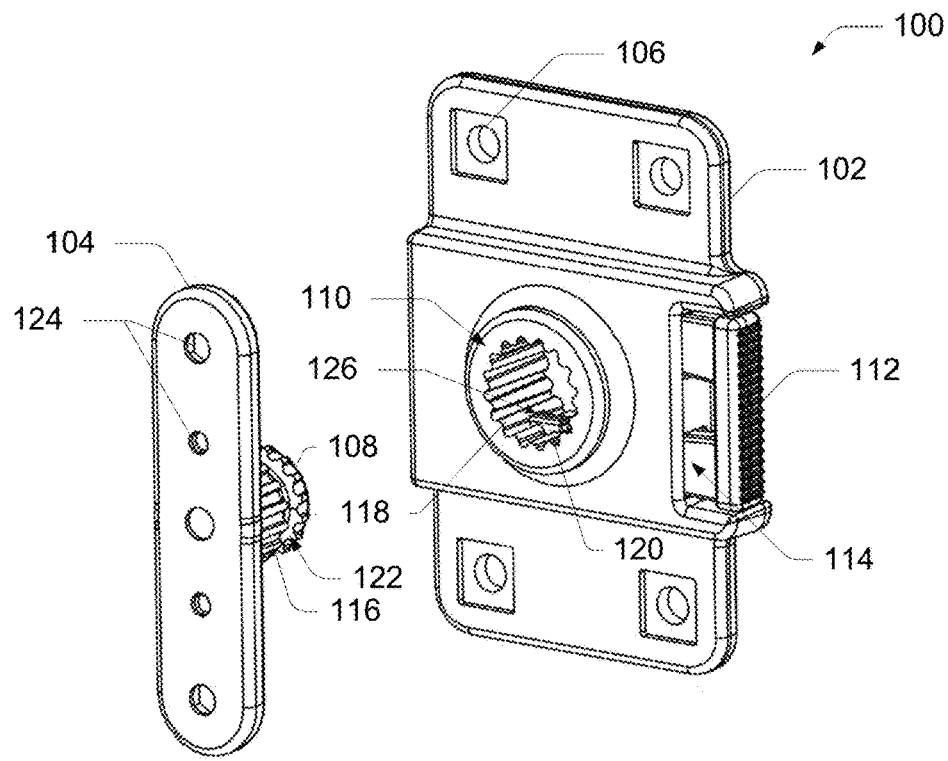
FIG. 1 shows a perspective view of an example spline attachment assembly, in a disconnected and locked configuration, according to an implementation.

Representative implementations of devices and techniques provide a spline attachment assembly to mount and to support an implement (such as a handgun, for example) or an implement holster (such as a handgun holster, for example), or the like, in a variety of configurations. The spline attachment assembly is arranged to be mounted in various locations for temporarily and safely mounting the implement, while making the implement easily accessible to the user.

For example, the base of the spline attachment assembly may be mounted to a convenient surface, such as on an article of clothing, on a personal accessory, on a wall, within a vehicle, on a portion of a desk or other furniture, on a bedframe, or the like, either within view or concealed from view. The base may be removed from one location and mounted to another location if desired, or multiple bases may be used in various locations by a user.

In some examples, the spline attachment assembly may be mounted to user-wearable supports for carrying the implement. For example, a portion of the spline attachment assembly (the post, for instance) may be mounted to a handgun holster and another portion of the spline attachment assembly (the base, for instance) may be mounted to a paddle, belt slide, etc. The spline attachment assembly then couples the holster to the paddle, belt slide, or the like, for carrying the holster (in an outside-the-waistband (OWB) configuration, for example).

The post of the spline attachment assembly can be attached to an implement, an implement case or holster (such as a handgun holster, for example), or the like. The post is inserted into a receiver of the base, which locks the post to the base, securing the holster to the base. In an implementation, the post can be inserted into the receiver in multiple orientations (e.g., angles of rotation) for user convenience.

In various implementations, the user can remove the implement or implement holster from their person, and mount the implement or implement holster to the base for temporary storage with easy access. For example, when preparing to use a vehicle, the user may remove a holster from a location on the user's person, and mount the holster to the base located inside the vehicle. The base may be coupled to the vehicle in a convenient location, within easy reach of the user while in the vehicle. The user can easily and quickly dismount the implement or implement holster from the base and place it on their person when desired (such as when leaving the vehicle). Alternately, the user can withdraw the implement from the holster for use while the holster remains mounted to the base. The implement may be returned to the holster while the holster is mounted to the base.

Techniques and devices are discussed with reference to example handgun holsters illustrated in the figures. However, this is not intended to be limiting, and is for ease of discussion and illustrative convenience. The techniques and devices discussed may be applied to a holster or to any of various cases, carriers, containers, implements, tools, objects, and the like, and remain within the scope of the disclosure. For the purposes of this disclosure, the generic term "carrier" is used to indicate any or all of the above.

Further, the shape and quantity of the spline attachment assembly components illustrated in the figures (including the base and the post) may vary to accommodate the various objects to be docked, as well as to accommodate various applications. In alternate embodiments, fewer, additional, or alternate components may be used and/or combined to form a spline attachment assembly having an equivalent function and operation.

Implementations are explained in more detail below using a plurality of examples. Although various implementations and examples are discussed here and below, further implementations and examples may be possible by combining the features and elements of individual implementations and examples.

Example Spline Attachment Assembly

An example spline attachment assembly ("mount") 100, as shown in FIGS. 1-7, allows for a carrier (such as an implement or an implement holster, for example) to be mounted to an article of clothing, a user accessory, a wall or other surface using a base component 102 and a post component 104, for example, which are components of the mount 100. In various implementations, the base 102 is arranged to be temporarily or permanently fixed to an article (e.g., an article of clothing, a user accessory, a belt, a strap, etc.) or a convenient surface (e.g., a wall, vehicle console, desk, bed, etc.), as desired, using one or more mounting holes 106 in the base 102 and permanent or temporary fasteners.

Figures 8A, 8B:
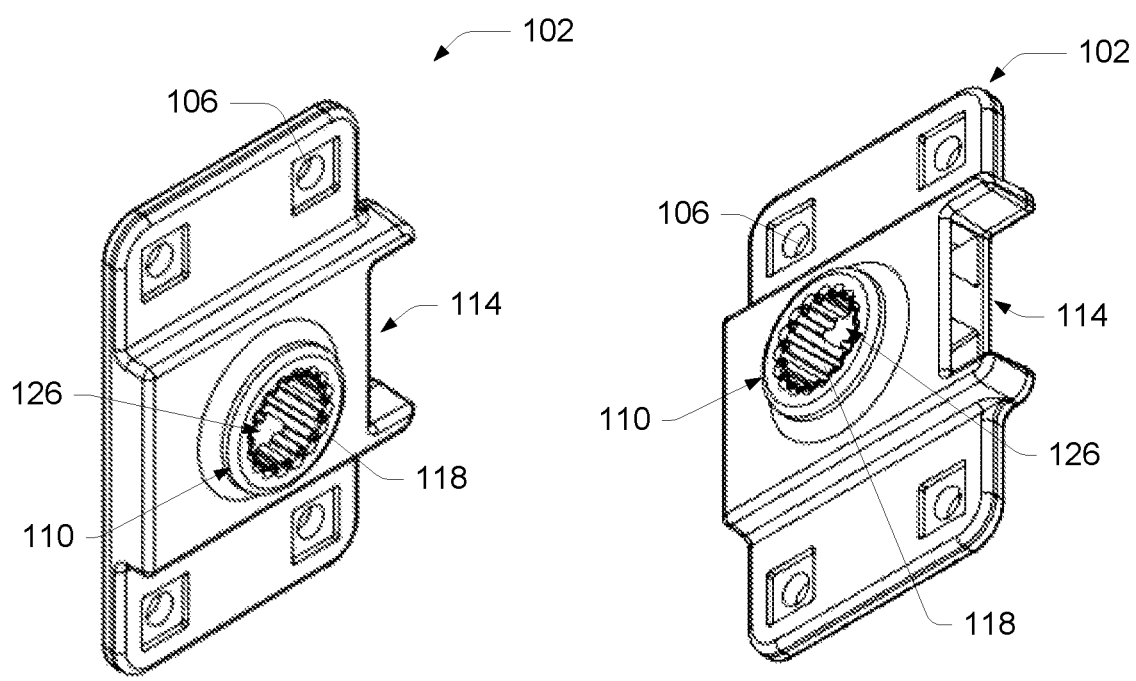
FIGS. 8A and 8B show perspective views of an example base unit, according to an implementation.

In an embodiment, the base 102 (see FIGS. 8A and 8B for example) comprises a substantially planar hard mount component having a receiver 110 (see FIGS. 9A and 9B for example), arranged to support an implement or an implement holster. The base 102 is arranged to receive a post 104 and to support the carrier attached to the post 104. In various implementations, the post 104 is arranged to be temporarily or permanently attached to an implement or implement carrier (using one or more mounting holes 124 in the post 104 and permanent or temporary fasteners), and to couple the carrier to the base 102, in one of multiple user-selected rotational orientations.

Referring to FIGS. 1-9B, in various embodiments, once the base 102 is attached to a desired surface, the carrier can be mounted to the base 102 by inserting a protruding shaft 108 of the post 104 into a receiver 110 of the base 102. As the shaft 108 is inserted into the receiver 110, one or more features (such as a catch 120, for example) of the base 102 locks onto the shaft 108, holding the shaft 108 within the receiver 110, until it is intentionally released. The features of the base 102 hold the post 104 securely in place on the base 102, regardless of the orientation of the post 104 with respect to the base 102. The post 104 may be released from the base 102 by activating a lock release button 112, for example. When the lock release button 112 is activated, the features release the shaft 108, and thus the post 104 from the base 102. The post 104 may then be pulled away from the receiver 110.

Figure 2:
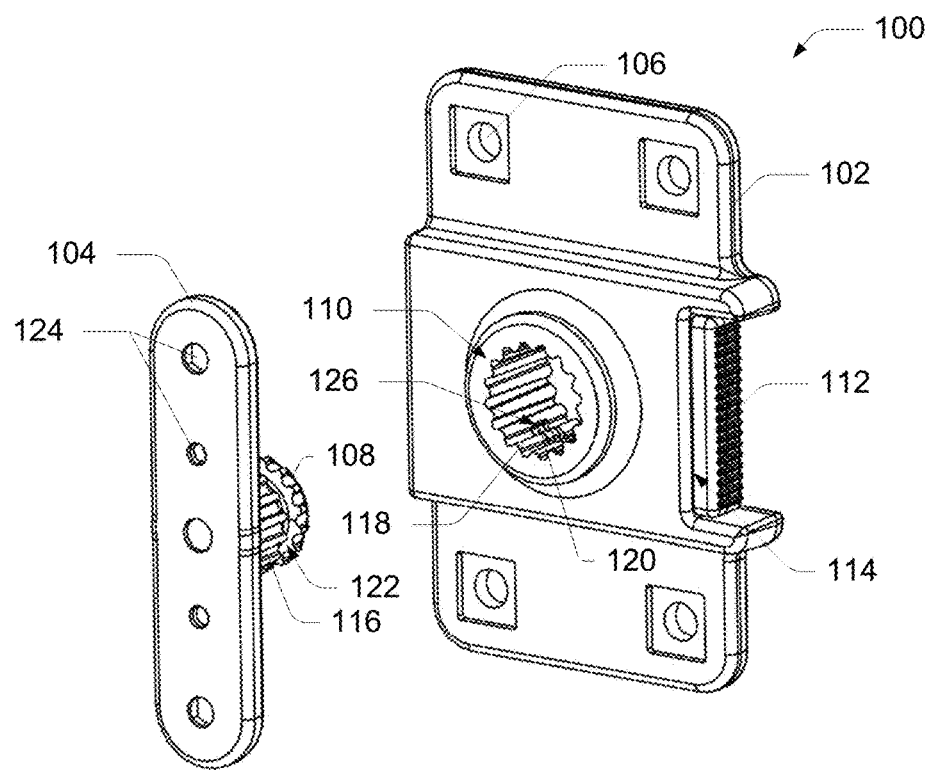
FIG. 2 shows a perspective view of an example spline attachment assembly, in a disconnected and unlocked configuration, according to an implementation.
Figure 9A:
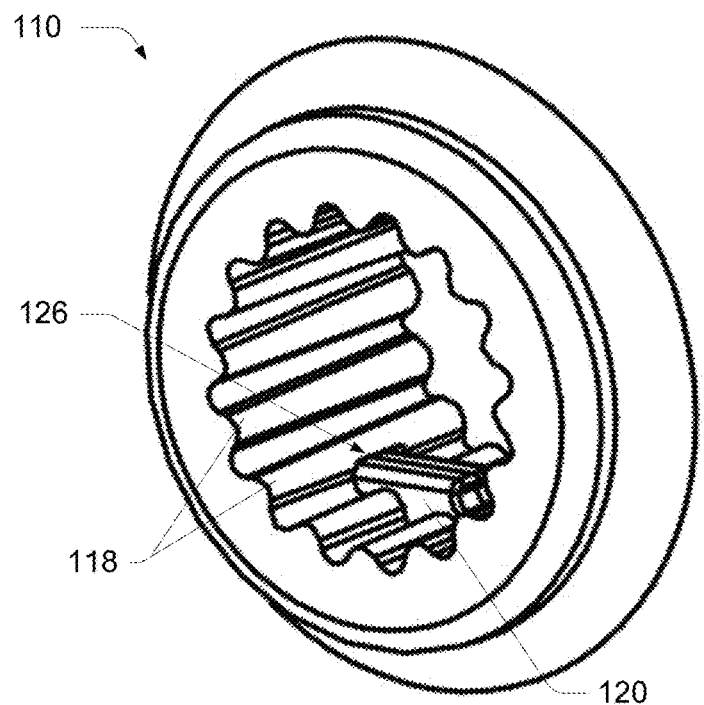
FIGS. 9A and 9B show detail views of an example receiver of a base unit, according to an implementation.
Figure 9B:
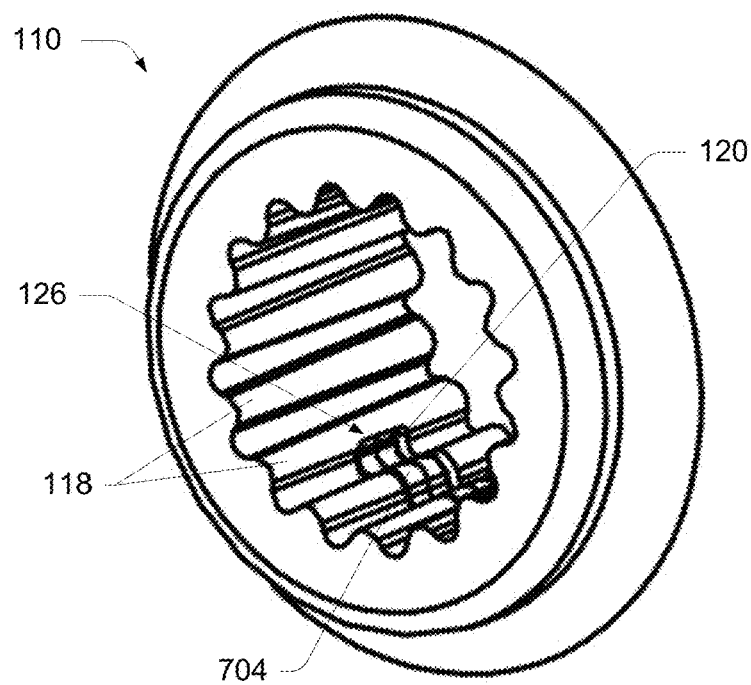

FIGS. 1 and 2 show the base 102 separated from the post 104. FIG. 1 shows the base 102 in a "locked" position (FIG. 9A shows a detail view of the receiver 110 in the "locked" position) and FIG. 2 shows the base in an "unlocked" position FIG. 9B shows a detail view of the receiver 110 in the "unlocked" position). The lock release button 112, which is inserted into a cavity 114 within the base 102 is allowed to slide in and out (relative to the base 102) within the cavity 114. In the locked position, as shown in FIG. 1, the lock release button 112 is in an extended position (e.g., the button 112 is extended out of the cavity 114). In the unlocked position, as shown in FIG. 2, the lock release button 112 is in a retracted position (e.g., the button 112 is pushed into the cavity 114). In various embodiments, the button 112 is spring-loaded, and is at rest in the extended position and is in compression in the retracted position. In other words, the button 112 will return to the extended position when it is released after being moved into the retracted position. In alternate embodiments the button is at rest in the retracted position.

Figure 3:
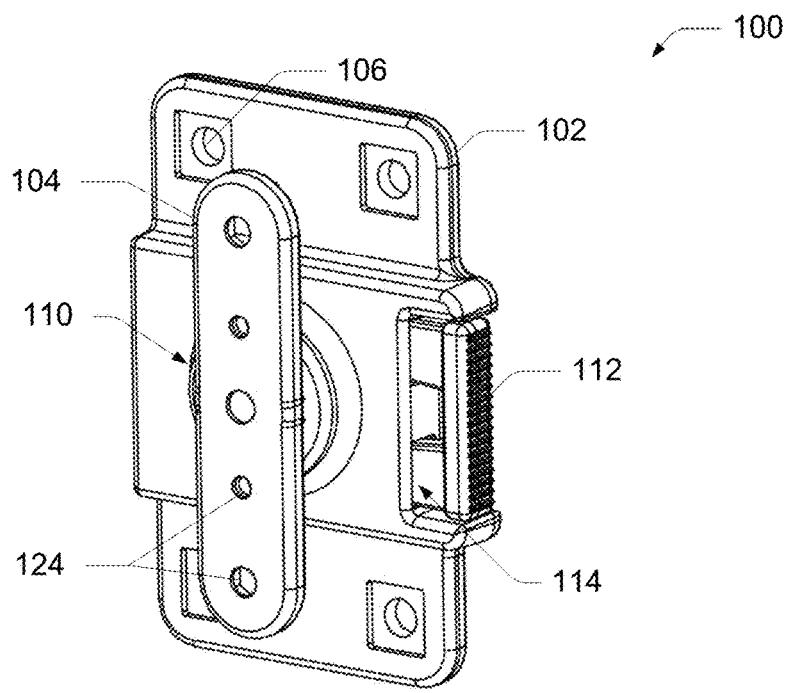
FIG. 3 shows a perspective view of an example spline attachment assembly, in a connected and locked configuration, according to an implementation.
Figure 4:
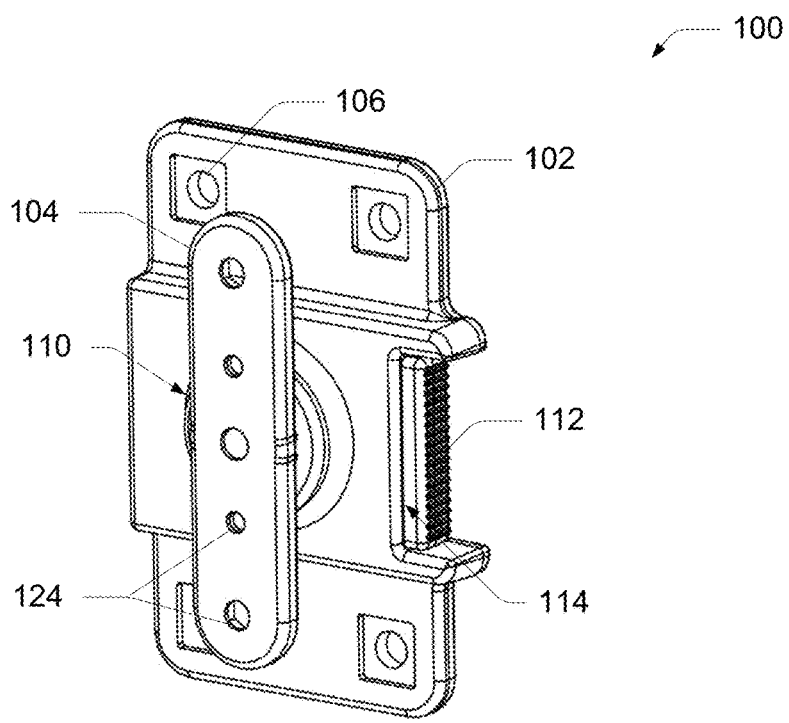
FIG. 4 shows a perspective view of an example spline attachment assembly, in a connected and unlocked configuration, according to an implementation.

FIGS. 3 and 4 show the base 102 coupled to the post 104. FIG. 3 shows the base 102 in a "locked" position and FIG. 4 shows the base in an "unlocked" position. Referring to FIGS. 1-4, the mount 100 is coupled together by inserting the shaft 108 of the post 104 into the receiver 110 of the base 102. A preselected quantity of input splines 116 arranged around an outer perimeter of the shaft 108 match up to the same preselected quantity and complementary shape of receiving splines 118 arranged around an inner perimeter of the opening of the receiver 110 for a secure fit. The input splines 116 mesh with the receiving splines 118 as the shaft 108 is inserted into the receiver 110. In an alternate implementation, the quantity of input splines 116 is less than the quantity of receiving splines 118, but each of the input splines 116 meshes with a receiving spline 118 to secure the shaft 108 to the receiver 110. In various implementations, the shape and profile of the input splines 116 and the receiving splines 118 may vary (e.g., rounded, curved, sharp, polygonal, keyway shaped, irregularly shaped, shallow, moderately deep, deep, etc.), with the input splines 116 arranged to mesh with the receiving splines 118 to removably couple the post 104 to the base 102.

The spline attachment nature of the mount 100 allows a user to position the implement or holster at various angles between 0 and 360 degrees, by positioning the shaft 108 into the receiver 110 at the desired rotational angle (i.e., cant). For example, depending on the number of input splines 116 and receiving splines 118, a number of discrete angular positions (e.g., discrete rotational angular increments) are possible between the post 104 and the base 102. In one embodiment, for example, the input splines 116 and receiving splines 118 allow for various angles in 22.5 degree increments. In other embodiments having other numbers of splines (116, 118), other angles are possible. A user can adjust the rotational orientation of the post 104 with respect to the base 102 (e.g., adjust the cant of the carrier attached to the post 104) at any time by unlocking the shaft 108, removing the shaft 108 from the receiver 110, and reinserting the shaft 108 into the receiver 110 at a new desired angle.

In an embodiment, the post 104 can be locked into the base 102 by a spring-loaded, sliding, or otherwise operated locking mechanism, such as a catch 120 (as shown at FIG. 9A, or like feature(s)) that traps the shaft 108 in the receiver 110. For example, the catch 120 can press against a groove 122 (as shown at FIGS. 1 and 2, or a like feature) in the shaft 108 when extended, overlapping the input splines 116 and preventing the shaft 108 from exiting the receiver 110 without user intervention. The catch 120 may be operated using lock release button 112, which may be spring loaded, for example. When the button 112 is operated (e.g., pushed in toward the base 1021, the catch 120 releases the shaft 108 and the post 104 can be removed from the base 102. In various embodiments, this locking method can work with other types of passive and active shaft 108 retention methods (e.g., a thumb push button, activation lever, etc.) allowing for versatility in operation and application.

Figure 5:
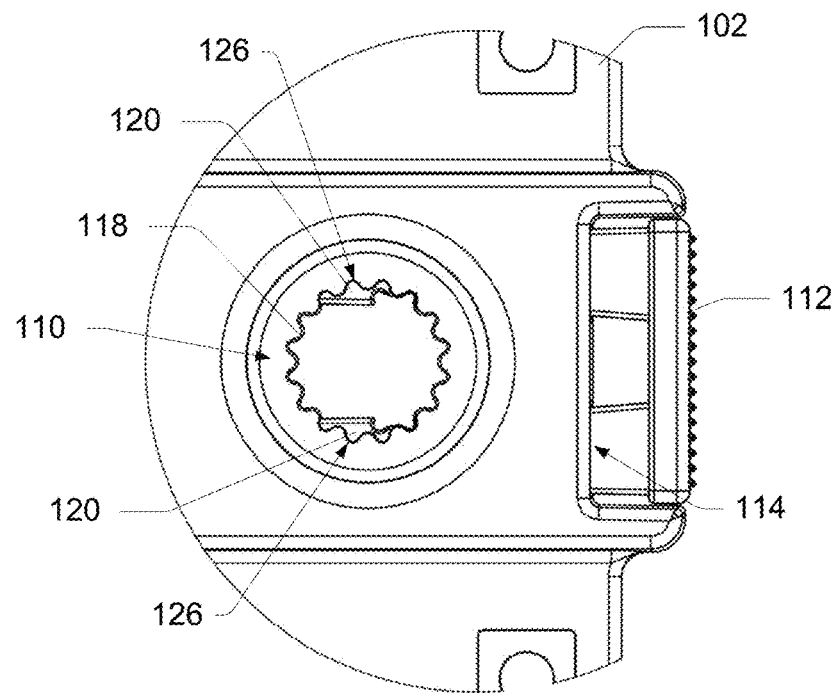
FIG. 5 shows a detail view of an example locking arrangement of a spline attachment assembly, in a locked configuration, according to an implementation.
Figure 6:
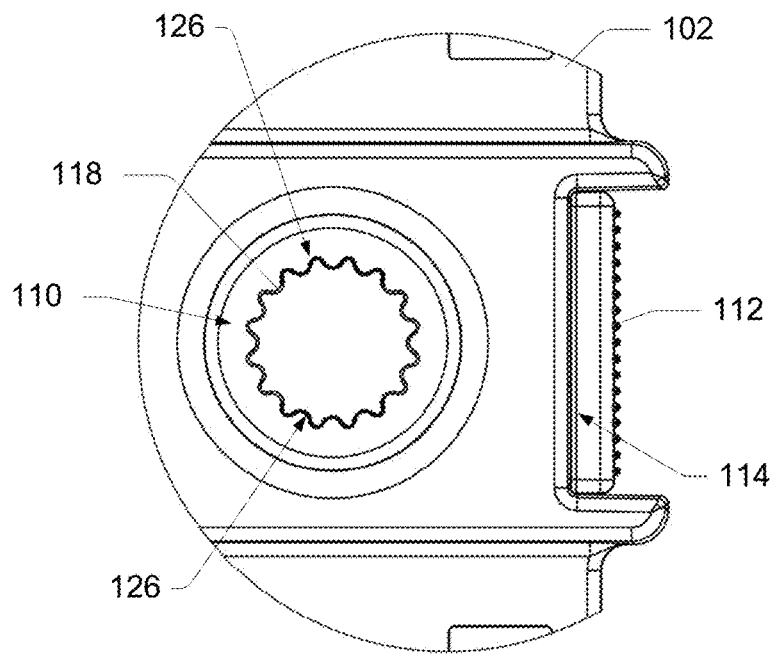
FIG. 6 shows a detail view of an example locking arrangement of a spline attachment assembly, in an unlocked configuration, according to an implementation.

FIG. 5 (and FIG. 9A) shows a detail view of the receiver 110 in a locked configuration (i.e., the locking mechanism in the locked configuration) and FIG. 6 (and FIG. 9B) shows a detail view of the receiver 110 in an unlocked configuration (i.e., the locking mechanism in the unlocked configuration). As shown in FIG. 5, when the base 102 (i.e., the locking mechanism) is in the locked configuration (the button 112 is extended), the one or more catches 120 protrude into the opening of the receiver 110 through one or more slots 126 in the wall of the receiver 110, and as shown in FIG. 6, when the base 102 (i.e., the locking mechanism) is in the unlocked configuration (the button 112 is retracted into the base 102), the one or more catches 120 are clear from the opening of the receiver 110 (e.g., the catches 120 do not protrude through the slot(s) 126). In various embodiments, the shaft 108 may be inserted into the receiver 110 with the base 102 in either the locked or the unlocked configuration.

Figure 7:
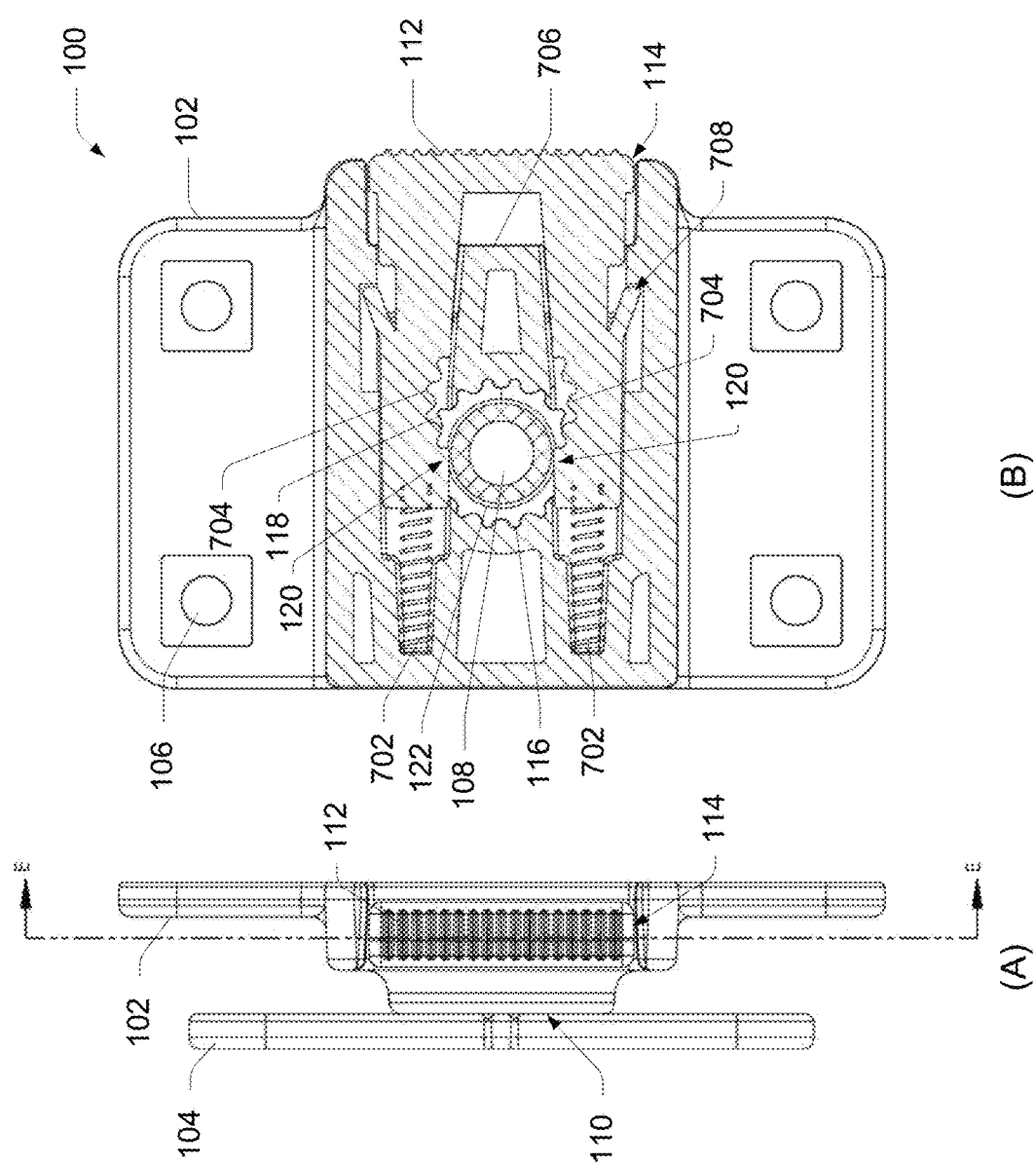
FIG. 7 shows a side view and a cut-away view of an example spline attachment assembly, in a connected and locked configuration, according to an implementation.

For example, FIG. 7 shows a cut-away view of the mount 100, with the section cut ("E") along the groove 122 of the shaft 108, while the shaft 108 is within the receiver 110, according to the embodiments. FIG. 7 shows a non-limiting example of the action of an example mount 100. In alternate implementations, other action techniques and/or other components may be employed to perform the functions disclosed. In an embodiment as shown at FIG. 7, the locking mechanism comprising the button 112/catch(es) 120 can have at least one leg (and may include two legs as shown in FIG. 7). The leg is arranged to move within a branch of the cavity 114 that abuts the receiver 110 when the locking mechanism is moved between a locked position and an unlocked position. In embodiments where the locking mechanism includes two legs, each leg moves within a corresponding branch of the cavity 114. For example, in some embodiments as shown at FIG. 7, the cavity 114 straddles the receiver 110 to form two branches of the cavity 114. Each of the two branches of the cavity 114 can intersect the receiver 110 to form two slots (i.e., slotted openings) 126 in the substantially cylindrical wall of the receiver 110.

As shown in FIG. 7, in the embodiments, the catch(es) 120 are integral to or coupled to the button 112, which is spring-loaded (using one or more springs 702, for example). For instance, the catch(es) 120 may be integral to or coupled to a leg of the locking mechanism comprising the button 112 component, or to both legs of the locking mechanism in embodiments having two legs (as shown in FIG. 7). The catch(es) 120 move out of the way when the shaft 108 is inserted into the receiver 110 while the locking mechanism is in a locked configuration, and move back into place (protruding into the receiver 110 opening through the one or more slots 126) when encountering the groove 122 of the shaft 108. In some implementations, the end of the shaft 108 may be somewhat tapered to facilitate moving the catches 120 out of the way when the shaft 108 enters the receiver 110. The reduced diameter of the shaft 108 at the groove 122 allows the catches 120/button 112 to return to the rest position (e.g., the extended position where the catches 120 protrude from the slot(s) 126), closing on the groove 122, which automatically traps the shaft 108 in the receiver 110.

In an embodiment, as shown in FIG. 7, the catch(es) 120/button 112 includes splined features 704, that are arranged to line up with the receiving splines 118 when the catch(es) 120 are moved out of the way by the shaft 108, as the shaft 108 enters the receiver 110, or when the button 112 is retracted into the base 102. For instance, the splined features 704 may be integral to a leg of the locking mechanism comprising the button 112 component, or to both legs of the locking mechanism in embodiments having two legs (as shown in FIG. 7). For example, depressing the button 112 aligns the splined features 704 to the receiving splines 118 so that the shaft 108 can be removed from the receiver 110 (to remove or reposition the post 104, for example). In some embodiments, as shown in FIG. 7, the interior of the base 102 (e.g., within the cavity 114) includes at least one stop feature 706 arranged to stop the inward movement of the catches 120/button 112 and to position the catches 120/button 112 so that the splined features 704 align with the receiving splines 118 when the button 112 is depressed. Additionally, the base 102 may include one or more other stops 708 arranged to stop the outward movement of the button 112, to align the catches 120/button 112 in the extended position.

The spline attachment assembly ("mount") 100 is discussed in terms of securing a holster, but the mount 100 may be used to secure or mount any of various items, where secure mounting with angular positioning are desired. Although various implementations and examples are discussed herein, further implementations and examples may be possible by combining the features and elements of individual implementations and examples.

In various implementations, components of the mount 100 are comprised of various plastics, composites, metals, combinations of the same, or the like. For example, the base 102 and/or the post 104 may be comprised of a polyamide, or similar material. For example, the mount 100 components may be injection molded, stamped, formed, or the like. In various embodiments, the mount 100 components have rigidity and stability properties based on a particular material selected for the mount 100 components. For example, some materials that may be used include styrenic block copolymers (TPE-s), polyolefin blends (TPE-o), elastomeric alloys (TPE-v or TPV), thermoplastic polyurethanes (TPU), Thermoplastic copolyesters, thermoplastic polyamides, various metals and alloys, fiber composites, combinations of the same, and the like. Additionally, in some embodiments, the stability properties are also based on a thickness of the mount 100 components.

In various implementations, the mount 100 may include fewer, more, or alternate components, and remain within the scope of the disclosure. In various embodiments, the shape and configuration of the mount 100 components may vary to accommodate different implements or applications. In an example, the base 102 and/or post 104 may be formed to closely fit a particular implement. In other examples, the base 102 and/or post 104 may be more generally formed to fit multiple implements.

The illustrations of FIGS. 1-9B are not intended to be limiting. In the various example embodiments illustrated in FIGS. 1-9B, the location and position of the components, locking mechanisms, and the like are for example only. Other locations and positions are contemplated and are within the scope of this disclosure. In some cases, additional or alternative components, techniques, sequences, or processes may be used to implement the techniques described herein. Further, the components and/or techniques may be arranged and/or combined in various combinations, while resulting in similar or approximately identical results. It is to be understood that a mount 100 may be implemented as a stand-alone device or as part of another system (e.g., integrated with other components). In various implementations, additional or alternative components may be used to accomplish the disclosed techniques and arrangements.

In various embodiments, the mount 100, or either of the base 102 and/or the post 104 may be added to an existing arrangement (such as holsters and holster mounting apparatus and assemblies, for example). For instance, the existing arrangements may be retrofitted with the mount 100 or with mount 100 components. In other embodiments, the mount 100 or mount 100 components may be a part of a new arrangement, such as a new holster rig, a vehicle accessory, a desk or wall mount arrangement, or the like.

Conclusion

Although the implementations of the disclosure have been described in language specific to structural features and/or methodological acts, it is to be understood that the implementations are not necessarily limited to the specific features or acts described. Rather, the specific features and acts are disclosed as representative forms of implementing the claims.

What is claimed is:

1. A mounting assembly, comprising:
    a base unit, including a substantially planar hard mount component having a substantially cylindrical receiver disposed within a perimeter of the substantially planar hard mount component and extending outwardly from the substantially planar hard mount component, the base unit includes a cavity within an interior of the base unit extending from an opening at an edge of the base unit to form a first branch of the cavity that abuts the receiver, a portion of the first branch intersecting the substantially cylindrical receiver to form a first slotted opening in a cylindrical wall of the receiver, the receiver having a preselected quantity of receiving splines;
    a post unit including a shaft having a preselected quantity of input splines, the shaft adapted to securely fit within the receiver, and the input splines adapted to mesh with the receiving splines to removably couple the post unit to the base unit; and
    a locking mechanism including a first leg that has a catch portion and a splined portion, wherein the first leg is arranged to move within the first branch of the cavity when the locking mechanism is moved between a locked position and an unlocked position, and wherein the catch portion protrudes through the first slotted opening and blocks the input splines of the shaft when the shaft is inserted into the receiver and the locking mechanism is in the locked position; and wherein a plurality of splines of the splined portion aligns with a plurality of the receiving splines and a plurality of the input splines of the shaft and allows the shaft to be removed from the receiver when the locking mechanism is in the unlocked position.

2. The mounting assembly of claim 1, wherein the locking mechanism is adapted to prevent the shaft from exiting the receiver without user intervention when the post unit is coupled to the base unit and the locking mechanism is in the locked position.

3. The mounting assembly of claim 1, wherein the cavity straddles the receiver to form two branches of the cavity, including the first branch and a second branch, and wherein the second branch intersects the substantially cylindrical receiver to form a second slotted opening in the cylindrical wall of the receiver, and wherein the locking mechanism comprises a substantially planar two-pronged component including the first leg and a second leg, wherein the second leg has a catch portion and a splined portion and is configured to move within the second branch of the cavity, and wherein the catch portion of the second leg is arranged to protrude through the second slotted opening in the cylindrical wall of the substantially cylindrical receiver when the locking mechanism is in the locked position.

4. The mounting assembly of claim 1, wherein the locking mechanism is adapted to automatically lock the shaft within the receiver when the shaft is inserted into the receiver.

5. The mounting assembly of claim 1, wherein the catch portion is arranged to trap a grooved feature intersecting the input splines of the shaft when the shaft is inserted into the receiver.

6. The mounting assembly of claim 5, wherein the locking mechanism further comprises a lock release mechanism adapted to move the catch portion out of the first slotted opening, releasing the grooved feature and allowing the shaft to be removed from the receiver when the locking mechanism is in the unlocked position.

7. The mounting assembly of claim 6, further comprising a mounting portion including one or more mounting holes for temporarily or permanently coupling the base unit to a desired surface.

8. The mounting assembly of claim 6, wherein the receiving splines, the input splines, and a position of the shaft relative to the receiver determine a rotational angle of the post unit relative to the base unit.

9. The mounting assembly of claim 8, wherein the rotational angle of the post unit relative to the base unit is user-adjustable from 0 to 360 degrees.

10. The mounting assembly of claim 8, wherein the rotational angle of the post unit relative to the base unit is user-adjustable via a quantity of discrete rotational angle increments.

11. The mounting assembly of claim 6, wherein the preselected quantity of receiving splines is equal to the preselected quantity of input splines.

12. The mounting assembly of claim 6, wherein the mounting assembly is configured to support an implement or an implement holster while the post unit is disposed in a plurality of user-selectable angular positions relative to the base unit.

13. A mounting assembly, comprising:
    a base unit arranged to support an implement or an implement holster, the base unit including a substantially planar hard mount component having a receiver, the receiver having a preselected quantity of receiving splines arranged on an inner perimeter of the receiver, and a cavity within an interior of the base unit extending an opening at an edge of the base unit and straddling the receiver to form two branches of the cavity, the branches intersecting the receiver to form two slotted openings in a substantially cylindrical wall of the receiver;
    a post unit including a shaft having a preselected quantity of input splines arranged on an outer perimeter of the shaft, the shaft adapted to securely fit within the receiver, and the input splines adapted to mesh with the receiving splines to removably couple the post unit to the base unit in one of a quantity of discrete rotational angles based on the preselected quantity of receiving splines; and a locking mechanism including two legs, each leg having a catch portion and a splined portion, wherein the two legs are arranged to move within the two branches of the cavity when the locking mechanism is moved between a locked position and an unlocked position, and wherein the catch portion of each of the legs is arranged to trap a groove of the shaft when the shaft is inserted into the receiver and the locking mechanism is in the locked position, and wherein a plurality of splines of the splined portion of each of the legs is arranged to align with a plurality of the receiving splines to allow the shaft to be removed from the receiver when the locking mechanism is in the unlocked position.

14. The mounting assembly of claim 13, wherein the two legs of the locking mechanism are coupled to or integral to a single common button, and wherein the locking mechanism is adapted to prevent the shaft from exiting the receiver without user intervention via the button when the post unit is coupled to the base unit and the locking mechanism is in the locked position.

15. The mounting assembly of claim 13, wherein a rotational angle of the post unit relative to the base unit is user-adjustable from 0 to 360 degrees.

16. A holster mounting assembly, comprising:

a base unit arranged to support a holster and an implement within the holster, the base unit including a substantially planar hard mount component having a receiver, the receiver having a preselected quantity of receiving splines arranged on an inner perimeter of the receiver, and a cavity within an interior of the base unit extending from an opening at an edge of the base unit and straddling the receiver to form two branches of the cavity, the branches intersecting the receiver to form two slotted openings in a substantially cylindrical wall of the receiver;

a post unit including a shaft, adapted to be coupled to the implement holster, the shaft having a preselected quantity of input splines arranged on an outer perimeter of the shaft, the shaft adapted to securely fit within the receiver, and the input splines adapted to mesh with the receiving splines to removably couple the post unit to the base unit and to determine a rotational angle of the post unit relative to the base unit based on a position of the shaft relative to the receiver; and a locking mechanism including two legs arranged to move respectively within the two branches of the cavity and to straddle the receiver, wherein each of the legs of the locking mechanism includes a catch portion that protrudes through the respective slotted openings and blocks the input splines of the shaft when the shaft is inserted into the receiver and the locking mechanism is in a locked position, and wherein each of the legs of the locking mechanism includes a spline d portion having a plurality of splines that aligns with a plurality of the receiving splines and a plurality of the input splines of the shaft and allows the shaft to be removed from the receiver when the looking mechanism is in an unlocked position.

* * * * *